United States Patent [19]

Dubouchet

[11] 3,815,742

[45] June 11, 1974

[54] APPARATUS FOR AND METHOD OF AUTOMATICALLY REMOVING POLLUTANTS FROM A FLOWING STREAM

[75] Inventor: Jacques L. Dubouchet, Larchmont, N.Y.

[73] Assignee: Societe Generale de Constructions Electriques et Mecaniques (Alsthom), Grenoble, France

[22] Filed: Mar. 23, 1972

[21] Appl. No.: 237,388

[52] U.S. Cl.................... 210/83, 210/154, 210/540, 210/DIG. 21
[51] Int. Cl............................................. E02b 15/04
[58] Field of Search......... 210/83, 84, 86, 121, 154, 210/156, 540, DIG. 21

[56] References Cited
UNITED STATES PATENTS

| 48,841 | 7/1865 | Scoville............................... 210/154 |
| 596,755 | 1/1898 | Marchall......................... 210/154 X |
| 2,497,177 | 2/1950 | McClintoch et al................ 210/154 |
| 2,670,848 | 3/1954 | Van Houten et al........... 210/540 X |
| 2,831,579 | 4/1958 | Gehle.............................. 210/540 X |
| 3,246,757 | 4/1966 | Martin.................................. 210/86 |
| 3,465,882 | 9/1969 | Bowersox............................ 210/154 |
| 3,527,348 | 9/1970 | La Lonne et al............... 210/540 X |
| 3,708,070 | 10/1970 | Bell.............................. 210/DIG. 21 |

*Primary Examiner*—John Adee
*Attorney, Agent, or Firm*—John J. Hart

[57] ABSTRACT

The apparatus herein essentially comprises a separator which is located alongside a liquid stream bed and in communication with the latter so that there is diverted thereunto at least a selected depth of the top of the stream extending below the maximum expected depth of pollutant material in the liquid, a vertical liquid chamber communicating at its bottom with the bottom of the separator, means for permitting the discharge of liquid from the upper portion of the chamber while maintaining the level of the liquid in the chamber at a given constant level above the maximum height of any interface that may exist in the separator between the liquid and pollutant material, and means for discharging the separated pollutant material collected in the separator. If the stream is diverted to the aforesaid depth this is done by controlling the flow of the stream so that at the place of diversion the level of the stream is maintained substantially constant, and such diversion is accomplished by blocking the flow in the top portion of the stream to the aforesaid depth and bypassing it through the separator.

7 Claims, 6 Drawing Figures

APPARATUS FOR AND METHOD OF AUTOMATICALLY REMOVING POLLUTANTS FROM A FLOWING STREAM

THE INVENTION

This invention is concerned with an apparatus for and a method of removing pollutants floating on the surface of a heavier flowing liquid, such as oil on the surface of naturally flowing water, or of water in a plant, canal, etc. The apparatus operates continuously whether or not the liquid stream is polluted, but if pollution of the type indicated occurs, it will automatically eliminate such pollution.

In accordance with the invention, there is provided a separator which is in communication with the stream bed or course so that there may be by-passed or diverted thereinto a selected depth of the top of the stream on which has been collected the pollutant material and in which this diverted discharge is enabled to separate by the pollutant material rising to form an upper layer. At the downstream end of the separator, there is provided a vertical liquid chamber which at its bottom is in communication with the bottom of the separator so that the separated liquid flows thereinto. Associated with this chamber are means for permitting the discharge of separated liquid from its upper portion while maintaining the level of the liquid in such chamber at a given constant level located above the maximum height of any interface that may exist in the separator between the liquid and pollutant material. Means are also provided for discharging the separated pollutant material collected in the separator.

The advantages and features of the invention will become more clear from a consideration of the following description, when read in connection with the accompanying drawings, in which FIG. 1 is a plan view of a tailwater canal in a plant provided with purification apparatus embodying the invention to remove any oil which may have been discharged into the stream of water flowing through the canal;

Figure 4:
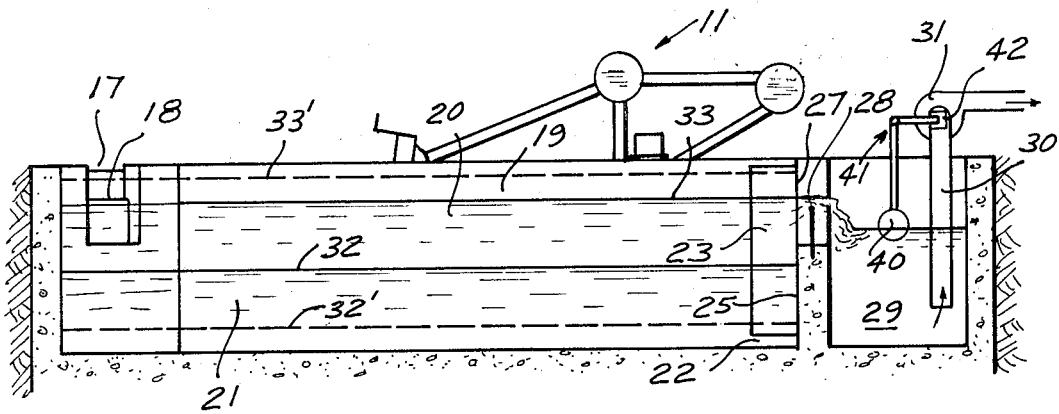
FIG. 4 is a vertical sectional view taken along the line IV—IV in FIG. 1.
Figure 5:
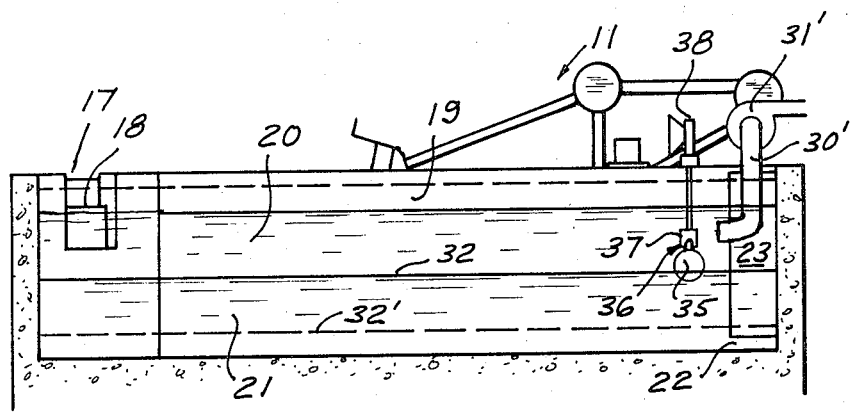
FIG. 5 is a vertical sectional view of a modified form of apparatus.
Figure 6:
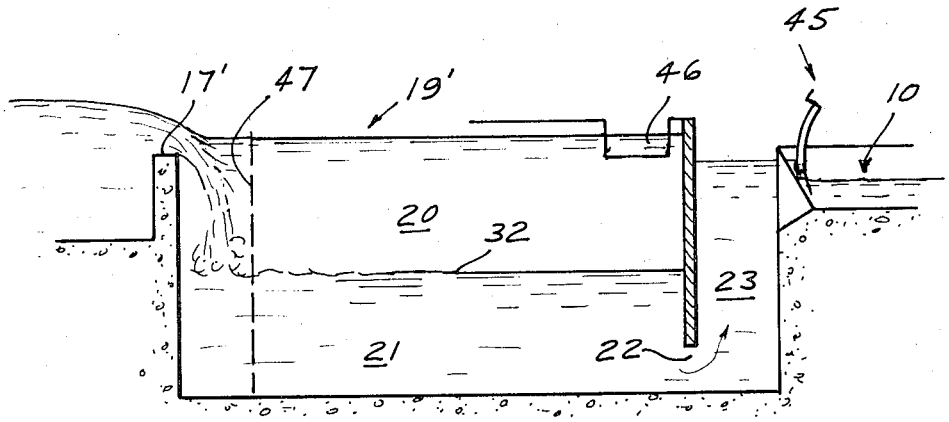
FIG. 6 is a vertical sectional view of a further modification of the invention.

It might be initially pointed out that the apparatus shown in FIGS. 1–5 is designed to divert into a separator forming a part thereof, a selected depth of the top of the stream, whereas the apparatus shown in FIG. 6 is designed so that the entire flow of the canal is diverted into the separator.

Figure 1:
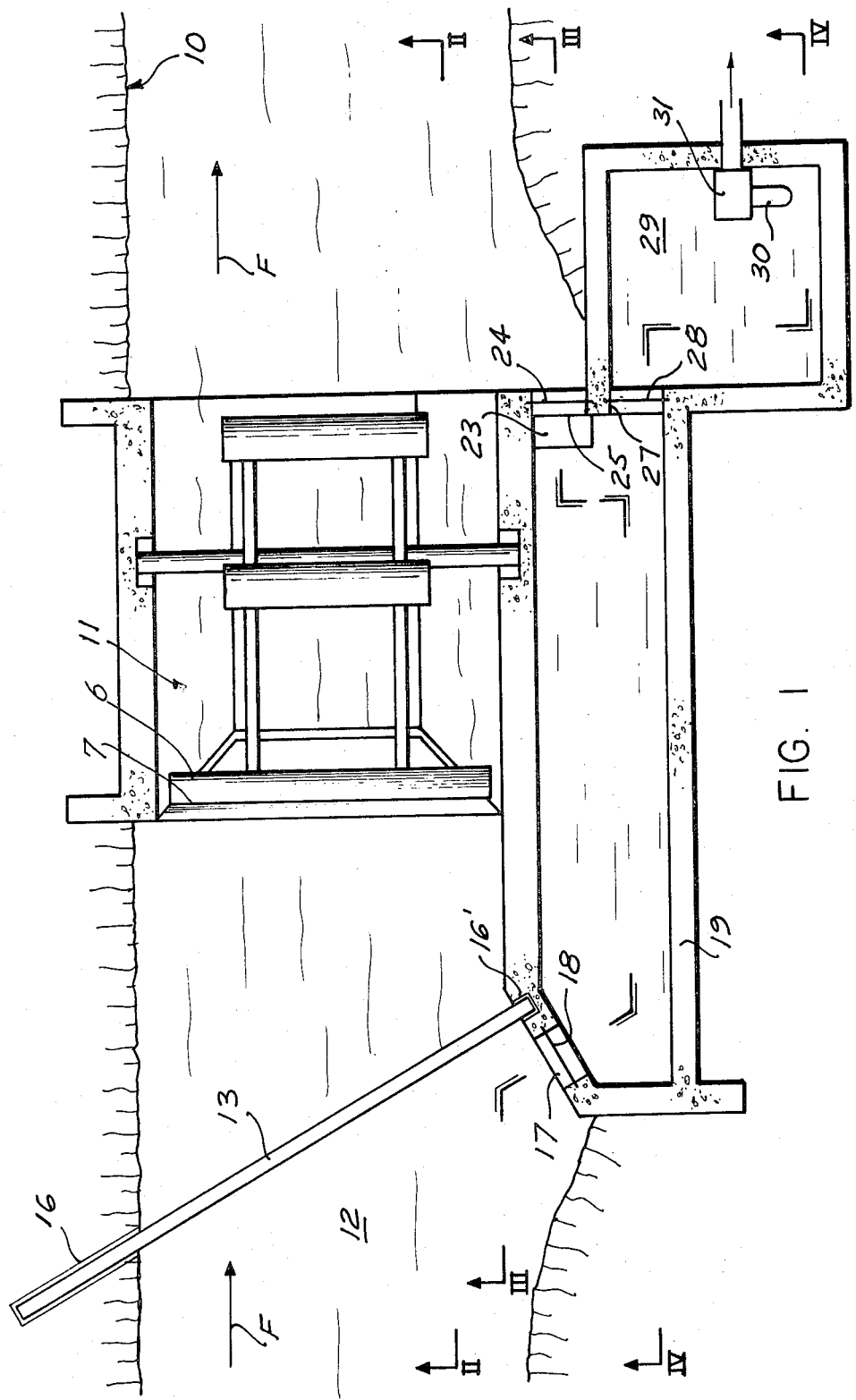
Figure 2:
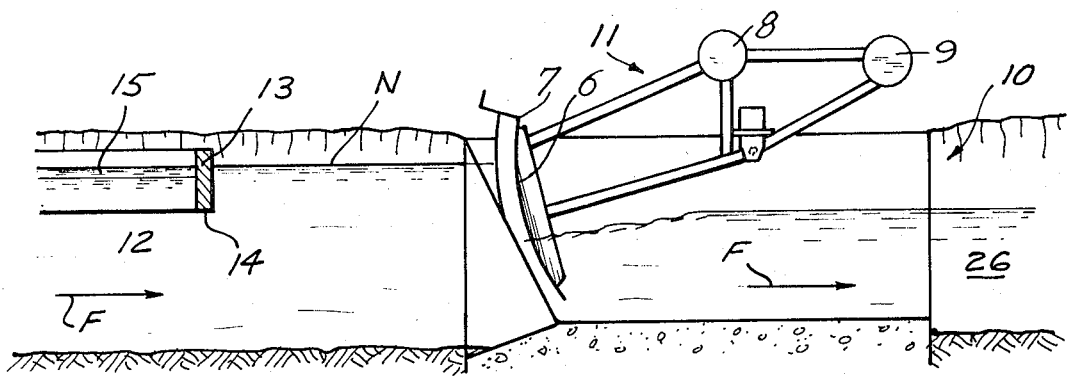
FIG. 2 is a vertical sectional view taken along the line II—II in FIG. 1.
Figure 3:
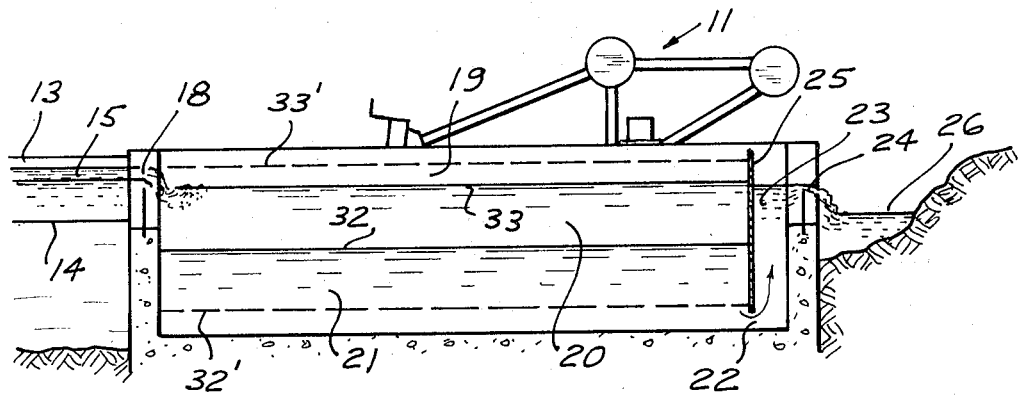
FIG. 3 is a vertical sectional view taken along the line III—III in FIG. 1.

Referring now more particularly to FIGS. 1–4 of the drawings, the reference numeral 10 designates generally a tailwater canal through which water discharged from a plant is returned to the river from which it was obtained. The flow of the stream of discharged water in the canal 10 is indicated by the arrows designated F. The canal is fitted with an automatic water gate 11 of a known type capable of controlling the flow of the stream in the canal so that the level N of the water in the portion 12 of the stream adjacently upstream from the gate 11 is maintained practically constant. The type of water gate 11 illustrated is, as is shown more clearly in FIGS. 1 and 2 of the drawings, composed of an apron 6 provided with a control float 7 on the upstream side thereof, and ballast containers 8 and 9 which cooperate with the float 7 to control the position of the apron 6 in the stream. In the area of such stream portion 12 there is provided a surface block formed by a baffle plate 13 bridging the canal and immersed in the stream portion 12 to a depth such that its lower edge 14 is below the maximum depth of the oil that might be expected to be present in the water at such stream portion. The layer of oil held back by the baffle plate 13 is indicated by the reference numeral 14 in FIGS. 2 and 3 of the drawings. The baffle plate 13 is supported at its ends in slots 16,16' built into the canal banks and located so that the plate 13 is inclined to the direction of flow of the stream and diverts the blocked oil 15 to a sluice 17 located adjacently upstream from the slot 16'. The sluice 17 includes an adjustable weir 18 connecting the canal 10 with a separator 19 in which the stream water will separate out from the oil and settle to the bottom of such separator. The separator 19 may be a conventional gravity separating tank or any other suitable type of gravity separator known to the art. As is known, the discharge capacity of any particular separator depends on its dimensions and on the relative specific gravities of the materials being separated. Thus, when the specific gravities of the materials are quite close, as may be the case with certain types of oil and water, the mixture should not be supplied to the separator in too fast a quantity in order to give it time enough to properly settle therein. On the other hand, in order to ensure that all proportions of the mixture of oil and water will be properly taken care of without any of the oil escaping downstream, the speed of feed of the mixture should be maintained as close as possible to the maximum capable of being properly handled by the separator. As the water level in the stream is constant, the proper feed of the mixture in order to obtain a correct operation of the separator, according to the relative specific gravity of the materials being separated, is effectively controlled by a preadjustment of the elevation of the weir 18. In FIGS. 3 and 4 the separated oil layer in the separator 19 is indicated by the numeral 20 and the separated water layer therein is designated 21.

It will be understood from the foregoing that the gate 11 ensures a constant level of the stream in the area 12 thereof wherein the travel of the oil to the river is blocked by the baffle plate 13. The baffle plate diverts the blocked oil toward the sluice 17, the weir 18 of which is adjustable to permit a certain depth of the top of the stream containing both water and oil to pass into the separator 19. The adjustment of the weir 18 is preferably such that it will permit a maximum discharge of oil-water mixture into the separator compatible with a proper operation of the separator whatever the proportions of oil and water exist in the mixture. In the event that with such adjustment, the operation of the separator does not keep up with the amount of oil that is being discharged into the stream, the baffle plate 13 will hold back such oil from moving downstream until it can be sent over the weir 18 and into the separator 19.

As is shown in FIGS. 2 and 3 of the drawings, there is provided at the bottom of the downstream end of the separator 19 a passageway 22 in the form of a slot which brings the separator into communication with a vertical compartment 23 that has a height approximating that of the separation compartment of the separator. Associated with the upper end portion of compartment 23 is a sluice provided with an adjustable weir 24 over which the separated water passes in its return to the portion 26 of the stream adjacently downstream of the gate 11 and from thence to the river. The upper end portion of the separator wall 25 to one side of the compartment 23 is provided with a sluice or passageway 27 in the form of a cutout which enables the layer 20 of oil that forms above the water layer 21 in the separator, to drain over an adjustable weir 28 disposed across the cutout 27 and into a tank 29 from whence it is discharged through a manifold 30 by a pump 31.

It will be understood from the foregoing and from a consideration of FIGS. 3 and 4, that the level of the water in the compartment 23 will be practically constant and that the level 33 of the surface of the oil layer in the separating compartment 19 will always be above such level of the water and by a margin proportional to the thickness of the oil layer 20. As a result, if the crest of the oil weir 28 is set slightly above the constant water level in compartment 23, there will be no discharge of oil to tank 29 whenever there is no oil in the separating chamber 19. The discharge of oil over the weir 28 will build up when oil is admitted into the separating compartment 19, and the thickness of the oil layer 20 increases. The altitudes of the interface 32 and the oil level 33 will stabilize when the outgoing oil discharge is equal to the incoming oil discharge into chamber 19. If for any reason, such as a failure of the pump 31, the level of the oil in tank 29 reaches the altitude 33, all the incoming oil has to accumulate in the chamber 19. When this occurs, the oil-water interface 32 in the separator 19, will be lowered down to a level as indicated by the dotted line position 32' of the interface, and the upper oil level 33 in the settler 19 will be raised, as indicated by the dotted line position 33' of such level. When the oil level 33 rises to the dotted line position 33' shown, the weir 18 will be drowned and passage of mixture from the upstream portion 12 of the stream to the separator 19 will be prevented. Preferably, the weirs 18 and 28 are so adjusted, that under such conditions the passage of oil originating from the upstream portion 12, through the upstream weir 18 is prevented just before the oil-water interface 32 reaches the slot 22 through which the water is discharged into compartment 23. The dotted line position 32' of the oil-water interface indicates such lowermost limit of the downward movement of the interface 32. When the oil-water interface reaches the dotted line position 32', with the consequent drowning of weir 18, oil will start to accumulate in the canal upstream of the barrier plate 13. As soon as this condition occurs, it is within the intention of this invention to give a suitable warning so that steps may be taken to remedy the situation. As is shown in FIG. 5 of the drawings, this may be accomplished by providing in the separator 19 a float 35 having a density of about 0.95 so that it will float between the oil layer 20 and the water layer 21 in the region of the oil-water interface 32. The float 35 may be connected by a suitable lever arrangement 36 to an electric switch contained in a housing mounted on a side wall of the separator 19. The switch is contained in a circuit which also includes a suitable warning device such as a siren 38.

It will be understood that the lever arrangement 36 is such that when the float 35 has dropped to a level indicated by the dotted line 32', it will actuate the switch in housing 37 to close the circuit containing the siren 38, thereby causing the latter to sound a warning. Such a float system may also be found desirable to control the pump 31 so that its operations conform to the amount of oil accumulating in the tank 29. As is shown in FIG. 4 of the drawings, such a system may comprise a float 40 connected by a suitable lever arrangement 41 to a switch mounted in a housing 42 supported on the manifold 30 and controlling the motor circuit of the pump. The lever arrangement 41 is such that when the float 40 is above a certain level the motor circuit will be closed to operate the pump, while when the float lowers to such certain level, the switch will be actuated to stop the operation of the pump.

It is also contemplated by this invention to omit the oil tank 29 in the manner shown in FIG. 5 of the drawings. In this construction the oil may be removed directly from the separator 19 by a pump 31' having a manifold 30' whose suction entry is located at a given height above the certain height indicated by the dotted line 32' at which the warning device is operated.

It is also within the contemplation of the invention to maintain the stream portion 12 from which the oil is removed at as constant a level as is possible by means other than the type of automatic gate hereinabove referred to and shown in FIGS. 1–5 of the drawings. Thus, the same result may be accomplished by means of a very long weir of conventional construction, or an electric gate controlled by the upstream level in a manner known to the art.

As has previously been indicated, instead of constructing the installation so that only the upper portion of the stream is skimmed off and diverted into the separator, the entire stream may be diverted into the separator. An embodiment of the invention functioning in this manner is illustrated in FIG. 6 of the drawings, wherein the reference numeral 19' indicates the separating chamber in which the oil and water are separated into the two layers 20 and 21 with the oil-water interface 32 therebetween. As in the previously discussed constructions, the water is drained off from the separator 19' through a passageway 22 and returned to the stream by way of a compartment 23. Instead of using a weir such as the weir 24 to maintain the level of the water in the compartment at a given, constant height, this may be accomplished in the embodiment of FIG. 6 by an automatic gate 45 of the type of gate 11 positioned adjacently downstream to the compartment 23. The oil is removed from the separator through a sluice 46 of the type of sluice 27 in FIG. 4 and communicating with a tank similar to tank 29 in such figure and similarly provided with a manifold and pump for the discharge of the oil accumulating therein. In view of the fact that the entire flow of the stream is diverted through a sluice 17' into the upstream end of the separator 19', the separator at its upstream end is provided with one or more screens 47 capable of restricting the agitation of the mixture created by such entry to a localized area so as not to interfere with the settling action of the separator 19'.

It will be observed from the showing and above description of the embodiment of FIG. 6, that aside from the fact that the entire flow of the stream is diverted into the separator instead of a given depth of the upper portion of the stream, such embodiment is essentially the same as the embodiment of FIGS. 1–4 and functions in a similar manner.

What is claimed is:

1. Apparatus for automatically removing from a flowing liquid stream any pollutant material lighter than such liquid that may be present in the stream, said stream having a variable flow and a bed capable of accommodating such variable flow, said apparatus comprising a water gate including an apron and means for controlling the position of said apron in the stream so as to maintain automatically a flow of constant level in a portion of the stream bed upstream from such water gate, a surface block associated with said upstream bed portion and penetrating the flow of the stream to a depth greater than that of the surface layer of pollutant material to cause the collection of pollutant on the surface of the flow of constant level contained in said upstream portion of the stream bed upstream of said surface block, while permitting the flow in the lower portion of the stream in said upstream bed portion to continue unrestricted to said water gate, and means for separating the pollutant material collected on the surface of the constant level flow in said upstream bed portion by said surface block from the liquid of the stream.

2. Apparatus as defined in claim 1 in which said separating means comprises a settling tank for receiving pollutant material and liquid from the constant level flow in said upstream bed portion, an adjustable spillway located upstream of said surface block and connecting the constant level flow in said upstream bed portion to said settling tank, the height of said spillway being set to a selected depth of the flow in said upstream bed portion and diverting therefrom to said settling tank pollutant material from said layer thereof in said upstream bed portion with a small quantity of liquid, and means for extracting separately the liquid and pollutant material separated in said settling tank.

3. Apparatus as defined in claim 2, in which the means for extracting the separated liquid comprises a vertically disposed liquid chamber having a height approximating the height of the mixture in said settling tank, first means for bringing the bottom of said settling tank into communication with the bottom of said liquid chamber to enable the separated liquid to flow thereinto from said settling tank, and second means for permitting the discharge of separated liquid from the upper portion of said liquid chamber while maintaining the level of the liquid in said chamber at a given constant level located above the maximum height of the interface existing in said settling tank between the liquid and pollutant material.

4. Apparatus as defined in claim 3, in which said second means comprises an adjustable spillway.

5. Apparatus as defined in claim 3, in which the means for extracting the separated pollutant material comprises means for discharging the separated pollutant material from the settling tank at a given height higher than the height of the level of the liquid in said liquid chamber.

6. The method of automatically removing from a flowing liquid stream having a variable flow in a stream bed capable of accommodating such variable flow, any pollutant material lighter than such liquid that may be present in the stream, comprising controlling the flow of the stream at a given place thereof, and exercising such control in automatic conformance to the variable flow of the stream at such given place so as to maintain the stream at a constant level in a local portion of the stream bed upstream from such given place, and thereby to reduce the velocity of flow of the stream in such local portion, blocking the flow in the top portion of the stream within such upstream bed portion of constant level so as to accumulate the pollutant assembled in such top portion of the stream as a result of the reduction in the velocity of flow of the stream within such upstream bed portion, while permitting the flow in the lower section of the stream to continue unrestricted toward said given place, and separating the pollutant material collected by said blocking action on the surface of such upstream area of constant level from the liquid of such stream.

7. The method defined in claim 6 in which the separating step is carried out by diverting from such upstream area of constant level and into a settling tank a selected depth of the top portion of the stream containing the pollutant material and liquid, and extracting separately the liquid and pollutant material separated in the settling tank by draining the separated liquid in the bottom of the settling tank into the bottom of a vertically disposed liquid chamber while discharging liquid from such chamber at a given constant level located above the maximum height of the interface existing in the settling tank between the liquid and pollutant material, and by removing the separated pollutant material at a place located at a given height above a certain highest position for such interface.

* * * * *

PO-1050
(5/69)

UNITED STATES PATENT OFFICE
CERTIFICATE OF CORRECTION

Patent No. 3,815,742    Dated June 11, 1974

Inventor(s) Jacques L. Dubouchet

It is certified that error appears in the above-identified patent and that said Letters Patent are hereby corrected as shown below:

Front sheet, first column between the paragraphs designated [21] and [52] there should be inserted, --[30] Foreign Application Priority Data March 25, 1971   France   71-11427--.

Signed and sealed this 29th day of October 1974.

(SEAL)
Attest:

McCOY M. GIBSON JR.
Attesting Officer

C. MARSHALL DANN
Commissioner of Patents